United States Patent [19]

Rose et al.

[11] 3,888,799

[45] June 10, 1975

[54] FLUOROPHOSPHAZENE POLYMERS CURABLE AT ROOM TEMPERATURE

[75] Inventors: Selwyn H. Rose, Beachwood; Kennard A. Reynard, Mentor, both of Ohio

[73] Assignee: Horizons Incorporated, Cleveland, Ohio

[22] Filed: Sept. 7, 1972

[21] Appl. No.: 287,205

Related U.S. Application Data

[62] Division of Ser. No. 33,871, May 1, 1970, Pat. No. 3,702,833.

[52] U.S. Cl............. 260/2 P; 260/2 S; 260/77.5 R; 260/77.5 CH; 260/80 C; 260/80 PS; 423/300; 423/302; 423/304
[51] Int. Cl............................................. C08g 33/16
[58] Field of Search ..................... 260/2 P; 423/300

[56] References Cited
UNITED STATES PATENTS 3,164,556   1/1965   Apley et al........................ 260/2 P
3,179,489   4/1965   Becke................................ 423/300
3,515,688   6/1970   Rose.................................. 260/2 P

FOREIGN PATENTS OR APPLICATIONS 947,634   1/1964   United Kingdom................ 423/300

OTHER PUBLICATIONS

Emeleos et al., "Advances In Inorganic Chemistry And Radiochemistry," Vol. 1, pages 359–363 (1959).

Primary Examiner—Wilbert J. Briggs, Sr.
Attorney, Agent, or Firm—Lawrence I. Field

[57] ABSTRACT

Improved P—N polymers in which at least some of the groups attached to the P atom contain reactive sites whereby the properties and the polymer may be modified by crosslinking and/or curing.

3 Claims, No Drawings ized, phosphonitrile copolymers with low glass
FLUOROPHOSPHAZENE POLYMERS CURABLE AT ROOM TEMPERATURE This application is a division of Ser. No. 33,871, filed May 1, 1970, now U.S. Pat. No. 3,702,833.

This invention relates to polymers containing repeating —P=N— units in the polymer chain.

The preparation of such copolymers is described in an article published in the Journal of Polymer Science, Vol. 6, No. 12, pages 837–839 (1968), and in a copending U.S. patent application Ser. No. 664,296 filed Aug. 30, 1967 and now issued on June 2, 1970 as U.S. Pat. No. 3,515,688, the disclosures of which are intended to be incorporated herein by reference.

The polymers described in that application are high molecular weight, elastomeric, chemically and thermally stable, phosphonitrile copolymers with low glass transition temperatures having randomly distributed repeating units of the formulas:

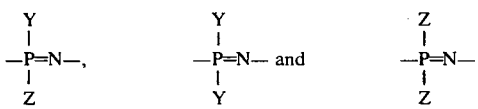

wherein Y represents a monovalent radical selected from the group consisting of $F(CF_2)_n(CH_2O)O$ and $H(CF_2)_n(CH_2)O$ — and $n$ is an integer from 1 to 4 wherein Z represents a monovalent radical selected from the group consisting of $F(CF_2)_m(CH_2)O$ — and $H(CF_2)_m(CH_2)O$ — and $m$ is an integer from $n + 2$ to $n + 5$ and the Y:Z ratio is between 1:3 and 3:1.

These copolymers are useful over a wide temperature range, have excellent physical properties and are unusually resistant to a wide range of solvents, acids and bases. However, they are relatively difficult to cure as compared with conventional elastomers. They may be crosslinked with suitable peroxide curing agents such as dicumyl peroxide or benzoyl peroxide at temperatures ranging from 250° to 400°F and in the presence of accelerators such as MgO.

The polymers of this invention contain small amounts of randomly distributed repeating units in addition to the repeating units described above. Examples of these additional repeating units are:

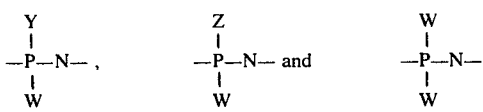

wherein Y and Z are defined as described above and W represents an unsaturated monovalent radical containing a group capable of further reaction at relatively moderate temperatures and the (Y + Z):W ratio is >5:1. Examples of W are —OCH = $CH_2$ —ORCH = $CH_2$; —OCR = $CH_2$; —Cl; —ORCF = $CF_2$; —$OCH_2RCF = CF_2$ and similar groups which contain unsaturation, where R is any aliphatic or aromatic radical including especially

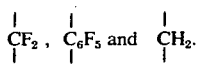

These groups are capable of further reaction at moderate temperatures in the presence of free radical initiators or other reagents, often even in the absence of accelerators.

It is also possible to use as W in the above formulas, monovalent radicals represented by the the formulas (1) —OSi(OR')$_2$R'' and other similar radicals which contain one or more reactive groups attached to silicon; (2) —OR''' NR'''H and other radicals which contain reactive —NH linkages. In these radicals R', R'' and R''' each represent aliphatic, aromatic and acyl radicals. Like the groups above, these groups are capable of further reaction at moderate temperatures in the presence of compounds which effect cross linking. The presence of a catalyst to achieve a cure is often desirable.

The polymers of the present invention are prepared by reacting a mixture of at least two different alkali metal fluoroalkoxides and a small percentage of an alkali metal alkylene alkoxide such as, for example, $NaOCH_2CH=CH_2$ with a soluble polymer of phosphonitrilic chloride. For example, a benzene solution of the $(PNCl_2)_n$ polymer was added to a mixture of $NaOCH_2CF_3$, $NaOCH_2C_3F_7$ and $NaOCH_2CH=CH_2$ in the mole ratio 1:1:0.06 in tetrahydrofuran and reacted under suitable conditions. The alkali metal compounds are present in stoichiometric excess of the $(PNCl_2)_n$ polymer. A terpolymer containing randomly distributed units of $[NP(OCH_2CF_3)_2]$, $[NP(OCH_2C_3F_7)_2]$ and $[NP(OCH_2CH=CH_2)_2]$ resulted. This polymer had similar properties to the $[NP(OCH_2CF_3)_2—NP(OCH_2C_3F_7)_2]_n$ copolymer described in the above noted copending application. However, the terpolymer was curable with appropriate peroxide curing agents in the presence of suitable accelerators at temperatures as low as 120°F, as compared with the copolymer described in the above noted application which is generally not cured at temperatures below 250°F.

The ability to be cured at temperatures below 250°F makes these polymers particularly useful for applications as potting and encapsulation compounds, fuel tank sealants, coatings and the like where high temperature cures are not feasible and/or desirable.

These crosslinking reactions are often run in the presence of inert, reinforcing or other fillers and the presence of these additives should in no way be construed as falling outside the scope of this invention.

a. Preparation of Linear High Molecular Weight Phosphonitrilic Chloride Precursor The trimer or tetramer or other low polymer of phosphonitrilic chloride is prepared from the monomer by conventional techniques.

The $(PNCl_2)_3$ trimer, recrystallized from hexane with activated charcoal to remove trace impurities, exhibited a melting point of 112°–115°C.

Forty-one grams of the recrystallized trimer were loaded into a polymerization tube. The trimer was dried and outgassed by alternately melting the sample, allowing it to cool to room temperature and evacuating the polymerization tube. This procedure was repeated two times. The polymerization tube was then sealed under vacuum.

The sealed tube was placed in a Woods Metal bath thermostatically maintained at 255°C ±5°C. After 30 hours the polymerization tube contained an extremely viscous fluid that was barely mobile at 255°C. It was then removed from the Woods Metal bath. The polymerization rate varied from run to run. Therefore, the reaction was terminated when an extremely viscous fluid (at 250°C) polymer was obtained, but before the onset of the crosslinking reaction that results in a considerable gel phase. The reaction times were from about 24 to about 48 hours. A further check on the completeness of the reaction was obtained by cooling the tube to room temperature. If considerable crystallization was observed, it was considered an indication that the trimer had not yet polymerized and that further heating was required.

The polymerization tube was broken under a nitrogen atmosphere and the bulk of the polymer was added to a flask protected by a nitrogen atmosphere which contained 250 ml of dry benzene (distilled from $CaH_2$). It normally took about 24 hours for all of the linear phosphonitrilic chloride polymer to dissolve. The ability of this polymer to dissolve in benzene distinguishes this linear polymer from "poly $NPCl_2$ rubber" described in U.S. Pat. No. 3,271,330 Example A, which will swell in, but not dissolve in benzene.

The linear phosphonitrilic chloride polymer was stored protected from moisture and was used promptly since after standing several days, the material usually crosslinks to form an insoluble gel.

EXAMPLE 1

Synthesis and Curing of
$[NP(OCH_2CF_3)_2]$-$[NP(OCH_2C_3F_7)_2]$-
$[NP(OCH_2CH_2CH=CH_2)_2]$ Terpolymer A mixture of 1,1,1-trifluoroethanol (0.24 mole), 2,2,3,3,4,4,4-heptafluorobutanol (0.24 mole) and 3-butene-1-ol (0.007 mole) was added at a rate which maintained mild reflux to 400 ml of dry tetrahydrofuran which contained freshly cut pieces of sodium (0.46 mole). When all the sodium had reacted, a benzene solution which contained linear phosphonitrilic chloride polymer (0.22 mole) was added dropwise to the vigorously stirred mixture at reflux. The reaction mixture was refluxed overnight, cooled and acidified with dilute hydrochloric acid. The solid reaction products (polymer and sodium chloride) were separated from the remainder of the mixture by filtration. The polymer was then dissolved in 200 ml of an azeotropic mixture of $CClF_2CCl_2F$ and acetone. The residual salts were removed by liquid phase extraction with water-acetone mixtures and the polymer isolated by precipitation into benzene. A colorless elastomer (21.3 g) was obtained.

Anal. calculated for 1:1:0.03 terpolymer: C, 21.2; H, 1.2; N, 4.1. Found: C, 21.3; H, 1.3; N, 4.2.

The terpolymer was an amorphous elastomer. It was insoluble in all the common solvents tried, namely ethers, alcohols, acteone, water, chloroform, hexane, and aromatic solvents. It dissolved completely in fluorocarbon solvents such as trichlorotrifluoroethane. It had an intrinsic viscosity of 1.5 dl/g in $F[CF(CF_3)CF_2O]_2CHFCF_3$.

Samples of the terpolymer cured at temperatures ranging from 120° to 200°F in the presence of a variety of peroxides and MgO or other suitable accelerators, with the temperature of cure being dependent on cure time and the peroxide utilized. Curing for 2 hours at 120°F using 4 parts of diacetyl peroxide per 100 parts of polymer produced a tough, strong, cured elastomer. The resulting elastomer swelled slightly in fluorocarbon solvents which would dissolve the terpolymer before cure. It was found that MgO need not be present for this cure to be effective. Similarly, other free radical initiators can be employed which are activated at low temperatures by heat and/or appropriate triggering agents such as cobalt naphthenate.

Similar terpolymer preparations utilizing larger relative quantities of $NaOCH_2CH_2CH=CH_2$ resulted in tougher less extensible elastomers while those prepared with smaller quantities of $NaOCH_2CH_2CH=CH_2$ resulted in lightly crosslinked elastomers that swelled extensively in fluorocarbon type solvents.

EXAMPLE 2

Synthesis and Curing of
$[NP(OCH_2CF_3)_2]$-$[NP(OCH_2C_3F_7)_2]$-
$[NP(OCH_2C(CH_3)=CH_2)_2]$ Terpolymer The sodium alkoxides of 1,1,1-trifluoroethanol, 2,2,3,3,4,4,4-heptafluorobutanol and 2-methyl-2-propene-1-ol were prepared and reacted with linear phosphonitrilic chloride polymer as described in Example 1 except the molar ratios of the alkoxides were 1:1:0.08. The white elastomer was insoluble in all common organic solvents but dissolved in selected fluorocarbon solvents. An intrinsic viscosity of 0.8 dl/g in $F[CF(CF_3CF_2O]_2CHFCF_3$ was obtained.

Anal. calculated for 1:1:0.08 terpolymer: C, 21.7; H, 1.3; N, 4.2. Found: C, 21.4; H, 1.3; N, 4.2.

This terpolymer was cured below 200°F both with benzoyl peroxide and with lauroyl peroxide in the presence of MgO. After curing, the polymer was virtually unaffected by the solvents that dissolve the uncured polymer.

EXAMPLE 3

Synthesis and Curing of
$[NP(OCH_2CF_3)_2]$-$[NP(OCH_2C_4F_8H)_2]$-
$[NP(OCH_2CH=CH_2)_2]$ Terpolymer This terpolymer was prepared utilizing the sodium alkoxides of 1,1,1-trifluoroethanol (0.26 mole), 2,2,3,3,4,4,5,5-octafluoropentanol (0.26 mole), allyl alcohol (0.003 mole) and linear $(PNCl_2)_n$ polymer (0.22 mole) as described in Example 1. This material was soluble in acetone, methanol, acetonitrile and the azeotrope of acetone and $CF_2Cl—CCl_2F$. When this terpolymer was treated with benzoyl peroxide in the presence of MgO for 1 hour at 200°F, the product was only slightly swelled by the solvents mentioned above.

EXAMPLE 4

Synthesis and Curing of
$[NP(OCH_2CF_3)_2]$-$[NP(OCH_2C_3F_7)_2]$-$[NPCl_2]$
Terpolymer Sodium (0.88 mole) was added to a 400 ml tetrahydrofuran solution of 1,1,1-trifluoroethanol (0.427 mole) and 2,2,3,3,4,4,4-heptafluorobutanol (0.427 mole) and the mixture refluxed overnight. The sodium alkoxide solution was separated from the residual sodium and added dropwise to a refluxing benzene solution (500 ml) of linear hexachlorophosphazene polymer (0.430 mole). After 24 hours, the polymer was isolated as shown in Example 1. The colorless elastomer was insoluble in all common organic solvents and had an intrinsic viscosity of 1.3 dl/g in $F[CH(CF_3)CF_2O]_2CHFCF_3$.

Anal. calculated for terpolymer: C, 21.0; H, 1.2; N, 4.1, Cl, 0.9. Found: C, 20.9; H, 1.2; N, 4.2; Cl, 0.7.

On treatment with dicumyl, benzoyl or lauroyl peroxides at temperatures ranging from 150° to 300 °F in the presence of MgO and piperazene, a crosslinked polymer was obtained which was swelled slightly in the azeotrope of acetone and $CF_2ClCCl_2F$.

EXAMPLE 5

Synthesis and Curing of
$[NP(OCH_2CF_3)_2]$-$[NP(OCH_2C_3F_7)_2]$-$[NP(OCH_2CF=CF_2)_2]$ Terpolymer The sodim alkoxides of 1,1,1-trifluoroethanol, 2,2,3,3,4,4,4-heptafluorobutanol and 2,3,3-fluoropropene-1-ol were prepared and reacted with linear hexachlorophosphazene polymer as described in Example 1. The mole ratio of the alkoxide was 1:1:0.10. The polymer had an intrinsic viscosity of 1.3 dl/g in $F[CF(CF_3)CF_2O]_2CHFCF_3$.

Anal. calculated for terpolymer: C, 21.2; H, 1.2; N, 4.1. Found: C, 21.2; H, 1.3; N, 4.1.

The colorless elastomer was insoluble in common organic solvents but dissolved in the azeotrope of acetone and $CF_2ClCCl_2F$. This terpolymer could be cured by free radical initiators or with fluorinated dienes, such as, $CF_2=CF—CF_2—CF=CF_2$. When the terpolymer was treated with perfluoropentadiene and heated to 150°–200°F for 1 hour, the material was found to be insoluble in the azeotrope of $CF_2ClCCl_2F$ and acetone.

The terpolymer may also be cured utilizing nitrile N-oxides. For example, when terephthalobis(nitrile N-oxide) (5 parts per hundred) was mixed with the terpolymer or similar polymers containing fluorinated unsaturated linkages, crosslinking took place overnight at room temperature. Again, the crosslinked polymer was rendered insoluble in solvents which previously would dissolve the terpolymer.

This invention is also concerned with the preparation of a novel copolymer that is useful as an intermediate in the preparation of the terpolymers of this invention, namely the $[NPCl_2—NP(OH)_2]_n$ copolymer. This copolymer is prepared by reacting the linear soluble $(PNCl_2)_n$ polymer with a small amount of water in an inert solvent under basic conditions. The resulting copolymer actually has three distinctive repeating units:

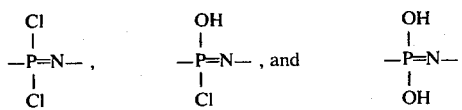

with the first two repeating units predominating.

The polymers of the present invention containing $OSi(OR)_2R$ or $—ORNRH$ groups can be prepared by two different reaction routes.

In the first reaction route, the linear soluble $(PNCl_2)_n$ polymer is reacted with a small amount of water in an inert solvent under basic conditions in order to form a copolymer containing a small percentage of P—OH linkages. The $[NPCl_2—NP(OH)_2]_n$ copolymer was subsequently reacted with a slight excess of an equimolar quantity of the appropriate mixed alkali metal fluoroalkoxides (e.g., $NaOCH_2CF_3$ and $NaOCH_2C_3F_7$). Following workup, a reactive terpolymer with randomly distributed units of $[NP(OCH_2CF_3)_2]$, $[NP(OCH_2C_3F_7)_2]$, and $[NP(OH)_2]$ is obtained.

A solution of this terpolymer was obtained in an inert solvent and it was then reacted with an appropriate silane containing two or more reactive groups (e.g. $(C_2H_5O)_3$—$SiC_6H_5$) resulting in substitution of the -OH group with an $—OSi(OC_2H_5)_2C_6H_5$ radical, for example. These terpolymers were curable at room temperature by reaction with reagents such as $(C_2H_5O)_2Si(OH)_2$ in the presence of weak acids or bases utilizing catalysts such as boric acid, sodium laurate, zinc oxide or magnesium oxide.

The second route involves the reaction of a mixture of at least two different alkali metal fluoroalkoxides along with a small percentage of a third alkali metal alkoxide containing groups capable of subsequent reactions to form crosslinkable $—NH_2$ or $—N(R)H$ moities. For example, the phosphonitrilic chloride polymer in benzene solution was reacted with $NaOCH_2CF_3$, $NaOCH_2C_3F_7$ and

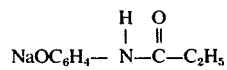

in the mole ratio 1:1:0.2. The resulting terpolymer was hydrolyzed to form a terpolymer with randomly distributed units of $[NP(OCH_2CF_3)_2]$ and $[NP(OC_6H_4NH_2)_2]$. This terpolymer cured at room temperature on treatment with phenyl diisocyanate.

The ability to be cured at room temperature makes these polymers like those previously described particularly useful for applications as potting and encapsulation compounds, fuel tank sealants, coatings and the like where room temperature cures are particularly desirable.

These aspects of the invention are further illustrated by reference to the following examples.

EXAMPLE 6

Preparation of $[NPCl_2—NP(OH)_2]_n$ Copolymer

The addition of 0.01 mole $H_2O$ and approximately 0.015 mole triethyl amine or pyridine to 0.20 mole linear phosphonitrilic chloride high polymer prepared as in (a) above resulted in the formation of the corresponding amine hydrochloride. The solution of the $[NPCl_2—NP(OH)_2]_n$ copolymer in benzene exhibited a Cl:OH ratio of approximately 40:1.

EXAMPLE 7

Synthesis and Curing of
$[NP(OCH_2CF_3)_2]$-$[NP(OCH_2C_3F_7)_2]$-$[NP(OSi(OC_2H_5)_2C_6H_5)_2]$ Terpolymer A mixture of $CF_3Ch_2OH$ (0.22 mole) and $C_3F_7CH_2OH$ (0.22 mole) was added to 0.42 mole sodium in 400 ml dry tetrahydrofuran. The reaction mixture was refluxed to quantitatively form the mixed sodium fluoroalkoxides.

A benzene solution of the copolymer $[NPCl_2—NP(OH)_2]_n$ (0.20 mole) having a Cl:OH ratio of 40:1 (Example 6) was added dropwise to the refluxing mixed sodium fluoroalkoxides. The mixture was refluxed until the reaction was complete. After 24 hours the mixture was cooled and acidified with dilute HCl.

The solids were separated by decantation and the polymer dissolved in 200 ml of the azeotrope of acetone and $CF_2ClCCl_2F$. Residual salts were removed by liquid phase extraction of the polymer solution with water-acetone solutions. The polymer was then purified by fractional precipitation into 1000 ml. of benzene.

The colorless elastomer containing randomly distributed units of $[NP(OCH_2CF_3)_2]$, $[NP(OCH_2C_3F_7)_2]$ and $[NP(OH)_2]$ was dissolved in 100 ml of $F[CF(CF_3)CF_2O]_2CHFCF_3$, and $(C_2H_5O)_3SiC_6H_5$ (0.06 mole) was added. The mixture was refluxed for 2 hours, cooled, and fractionally precipitated into 1000 ml of benzene. The colorless elastomer had an intrinsic viscosity of 0.9 dl/g in $F[CF(CF_3)CF_2O]_2CHFCF_3$.

Anal. calculated for 1:1:0.05 $[NP(OCH_2CF_3)_2$—$NP(OCH_2C_3F_7)_2$—$NP(OSi(OC_2H_5)_2C_6H_5)_2]_n$ terpolymer: C, 22.1; H, 1.4; N, 4.1. Found: C, 22.2; H, 1.4; N, 4.1.

The terpolymer was insoluble in all common organic solvents but was soluble in selected fluorocarbon solvents. When the polymer was treated with $(C_2H_5O)_2Si(OH)_2$ or $(C_2H_3O)Si(OH)_3$ in the presence of weak acids or weak bases and allowed to stand overnight at room temperature, a material which was only slightly affected by fluorocarbon solvents was obtained. After several days standing at room temperature further weight losses were minimal and the material was unaffected by the fluorocarbon solvents, indicating a complete cure. Catalysts such as boric acid, sodium laurate, zinc oxide and magnesium oxide were sometimes employed to facilitate the cure.

EXAMPLE 8

Synthesis and Curing of
$[NP(OCH_2CF_3)_2]$-$[NP(OCH_2C_3F_7)_2]$-$[NP\{OSi(OC_2H_5)_3\}_2]$ Terpolymer The sodium alkoxides of 1,1,1-trifluoroethanol (0.21 mole) and 2,2,3,3,4,4,4-heptafluorobutanol (0.21 mole) were prepared as described in Example 7. A benzene solution of the copolymer $[NPCl_2$-$NP(OH)_2]_n$ (0.20 mole) having a Cl:OH ratio of 40:1 (Example 6) was reacted with the alkoxides and isolated as described above.

This colorless elastomer containing randomly repeating units of $[NP(OCH_2CF_3)_2]$, $[NP(OCH_2C_3F_7)_2]$ and $[NP(OH)_2]$ was dissolved in $F[CF(CF_3)CF_2O]_2CHFCF_3$, treated with $(C_2H_5O)_3SiOH$ and refluxed for several hours and the product purified by several fractional precipitations into benzene. An intrinsic viscosity for the elastomer of 1.2 dl/g in $F[CF(CF_3)CF_2O]_2CHFCF_3$ was obtained.

Anal. Calculated for 1:1:0.5 $[NP(OCH_2CF_3)_2$—$NP(OCH_2C_3F_7)_2$—$NP\{OSi(OC_2H_5)_3\}_2]$: C, 21.5; H, 1.4; N, 4.1. Found: C, 21.4; H, 1.3; N, 4.1.

The terpolymer was insoluble in all common organic solvents but was soluble in selected fluorocarbon solvents. When the polymer was treated with $(C_2H_5O)_2Si(OH)_2$ in the presence of catalysts such as dibutyltin laurate, lead oxide or organometallic reagents at room temperature, crosslinking occurred. The material was no longer soluble in the reagents which dissolved it prior to curing.

EXAMPLE 9

Synthesis and Curing of
$[NP(OCH_2C_2F_4H)_2]$-$[NP(OCH_2C_6F_{12}H)_2]$—$NP(OSi(CH_3)_2H)_2]$ Terpolymer The copolymer $[NPCl_2$—$NP(OH)_2]_n$ was prepared as described above, except that in this case 0.02 mole $H_2O$ and 0.03 mole triethyl amine were utilized. The resulting copolymer had a Cl:OH ratio of approximatedly 20:1. The benzene solution of the copolymer (0.20 mole) was added dropwise to a refluxing solution of 0.22 mole $NaOCH_2C_2F_4H$ and 0.22 mole $NaOCH_2C_6F_{12}H$ in 400 ml dry tetrahydrofuran. The resulting elastomer, a terpolymer of $[NP(OCH_2C_2F_4H)_2]$, $[NP(OCH_2C_5F_{12}H)_2]$ and $[NP(OH)_2]$, was isolated as described in Example 7.

It was then dissolved in $F[CF(CF_3)CF_2O]_2CHFCF_3$ and refluxed with $(CH_3)_2HSiOH$ or $(CH_3)_2HSiOC_2H_5$ for several hours. The terpolymer was isolated by precipitation into benzene. It was colorless elastomer with an intrinsic viscosity of 0.8 dl/g in $F[CF(CF_3)CF_2O]_2CHFCF_3$.

Anal. calculated for 1:1:0.1 $[NP(OCH_2C_2F_4H)_2$—$NP(OCH_2C_6F_{12}H)_2$—$NP(OSi(CH_3)_2H)_2]_n$: C, 23.7; H, 1,3; N, 2.9. Found: C, 23.8; H, 1.2; N, 2.9.

The terpolymer was soluble in selected organic and fluorocarbon solvents until cured whereupon it was slightly swolledn or unaffected by these solvents. Cures were accomplished by treatment of the terpolymer with $(C_2H_5)_2Si(OH)_2$ or $(C_2H_5)Si(OH)_3$ at room temperature in the presence of catalysts. Organometallic catalysts or salts of acyl compounds were used to facilitate cures. Examples of the catalysts employed are tetraethyl tin, tetraethyl lead, ferric benzoate and cupric octoate.

EXAMPLE 10

Synthesis and Curing of

Terpolymer

The terpolymer $[NP(OCH_2CF_3)_2$—$NP(OCH_2C_4F_8H)_2$—$NP(OH)_2)_2]_n$ was prepared by an analogous procedure to that described in Example 7 except 0.02 mole water and 0.03 mole pyridine was used. After isolation of the product, it was dissolved in $F[CF(CF_3)CF_2O]_2CHFCF_3$ and treated with $(CH_3CO_2)_3SiCH_3$ under an inert atmosphere. Compounds of the type $(CH_3CO_2)_3Si(OC_2H_5)$ or $CH_3CO_2)_4Si$ were also found to be capable of crosslinking. After refluxing the mixture for several hours the terpolymer was isolated by precipitation into dry benzene. The colorless elastomer was soluble in selected organic and fluorocarbon solvents.

Anal. calculated for

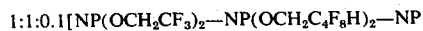

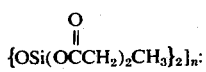

C, 22.4; H, 1.5; N, 3.7. Found: C, 22.4; H, 1.4; N, 3.8.

This terpolymer was crosslinked at room temperature by exposure to moist air. A cure at the surface of the polymer was evident before one hour, and the cure continued for several days until the whole mass was a rubber insoluble in the solvents that previously dissolved the elastomer.

EXAMPLE 11

Synthesis and Curing of [NP(OCH$_2$CF$_3$)$_2$]-[NP(OCH$_2$C$_3$F$_7$)$_2$]-[NP(OC$_6$H$_4$NH$_2$)$_2$] Terpolymer The alkoxides of 1,1,1-trifluoroethanol (0.50 mole) 2,2,3,3,4,4,4-heptafluorobutanol (0.50 mole) and N-parahydroxyphenyl propionamide (0.01 mole) were prepared by reaction with sodium, (0.98 mole) in dry tetrahydrofuran. Linear Phosphonitrilic chloride (see (a) above) (0.45 mole) was dissolved in 500 ml benzene and added dropwise to the alkoxides at a rate which maintained reflux. The reaction mixture was refluxed for 24 hours resulting in the formation of the terpolymer [NP(OCH$_2$CF$_3$)$_2$—NP(OCH$_2$C$_3$F$_7$)$_2$—NP(OC$_6$H$_4$N(H)C(O)C$_2$H$_5$)$_2$]$_n$. The solids were placed in contact with water, then dissolved in an azeotropic mixture of CCl$_2$FCClF$_2$ and acetone and washed with dilute alocholic alkali, whereupon the hydrolysis of the

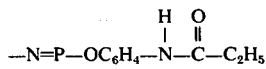

linkage to —N=P=OC$_6$H$_4$—NH$_2$ was assured. Upon precipitation into benzene, this polymer was obtained as a colorless elastomer. An intrinsic viscosity at 1.2 dl/g in F[CF(CF$_3$)CF$_2$O]$_2$CHFCF$_3$ was found.

Anal. calculated for 1:1:0.02 [NP(OCH$_2$F$_3$)$_2$—NP(OCH$_2$C$_3$F$_7$)$_2$—NP(OC$_6$H$_4$NH$_2$)$_2$[$_n$; C, 21.2; H, 1.2; N, 4.1. Found: C, 21.1; H, 1.2; N, 4.1.

The polymer was insoluble in all common organic solvents, but was soluble in selected fluorocarbon solvents. When treated with phenyl diisocyanate at room temperature, the polymer was crosslinked and rendered insoluble in these same fluorocarbon solvents.

EXAMPLE 12

Synthesis and Curing of [NP(OCH$_2$CF$_3$)$_2$]-[NP(OCH$_2$C$_3$F$_7$)$_2$]-[NP(OC$_3$H$_6$NH$_2$)$_2$] Terpolymer This terpolymer was prepared as described in Example 11 except 0.03 mole N-(3 hydroxy-n-propyl) acetamide was substituted for N-parahydroxyphenyl propionamide. The resulting [NP(OCH$_2$CF$_3$)$_2$—NP(OCH$_2$C$_3$F$_7$)$_2$—NP(OC$_3$H$_6$N(H)C(O)C$_2$H$_5$)$_2$]$_n$ terpolymer was hydrolyzed to form [NP(OCH$_2$CF$_3$)$_2$—NP(OCH$_2$C$_3$F$_7$)$_2$—NP(OC$_3$H$_6$NH$_2$)$_2$]$_n$. This terpolymer had an intrinsic viscosity of 1.4 dl/g in F[CF(CF$_3$)CF$_2$O]$_2$CHFCF$_3$.

Anal. calculated for 1:1:0.06 [NP(OCH$_2$CF$_3$)$_2$—NP(OCH$_2$C$_3$F$_7$)$_2$—NP(OC$_3$H$_6$NH$_2$)$_2$]$_n$: C, 21.2; H, 1.3; N, 4.1. Found: C, 21.2; H, 1.4; N, 4.1.

The terpolymer was soluble in selected fluorocarbon solvents, but became insoluble after cure. Cures were accomplished at room temperature after standing overnight with methyl ethylene-bis(urethane). Similarly, diacids and diacid chlorides were successful in crosslinking the terpolymer but acidic compounds or acidic by-products in the cure are less desirable than the by-product alcohol produced above.

We claim:

1. Terpolymers having randomly distributed repeating units represented by the formulae:

where Y represents a monovalent radical selected from the group consisting of F(CF$_2$)$_n$(CH$_2$)O— and H(CF$_2$)$_n$(CH$_2$)O— and $n$ is an integer from 1 to 4 and where Z represents a monovalent radical selected from the group consisting of F(CF$_2$)$_m$(CH$_2$)O— and H(CF$_2$)$_m$(CH$_2$)O— and $m$ is an integer from $n + 2$ to $n + 5$ and the Y:Z ratio is between 1:3 and 3:1 and where W represents a group capable of further chemical reaction at moderate temperatures and selected from the group consisting of Cl and OH, and mixtures thereof; and the (Y + Z):W ratio is greater than 5:1.

2. Terpolymers as described in claim 1 wherever W is OH.

3. The process consisting of partially hydrolyzing a (PNCl$_2$)$_n$ linear polymer with a small amount of water in an inert solvent under basic conditions to form an [NPCl$_2$—NP(OH)$_2$]$_n$ copolymer in which the ratio of Cl:OH is >5:1 and then reacting the said copolymer with a slight excess of at least one alkali metal fluoroalkoxide, to form phosphonitrile polymers of claim 1 containing a small quantity of a reactive —OH moiety.

* * * * *